Figure 1:
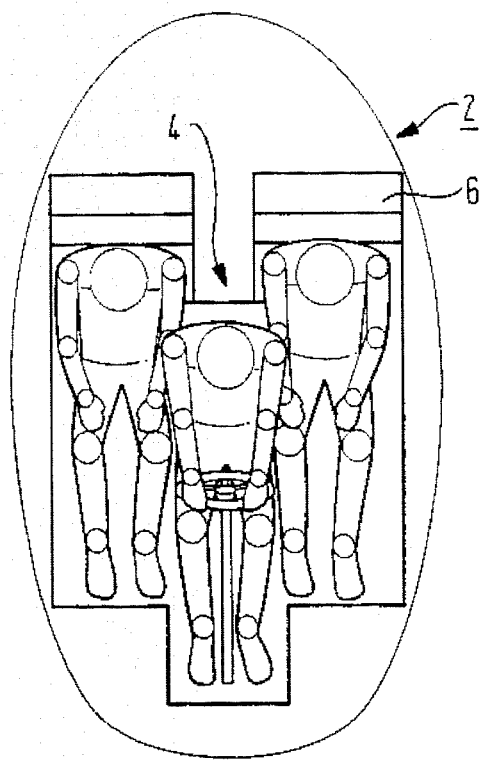

United States Patent [19]

Murray

[11] Patent Number: 5,538,309
[45] Date of Patent: Jul. 23, 1996

[54] VEHICLE BODY

[75] Inventor: Gordon Murray, Guildford, England

[73] Assignee: McLaren Cars N.V., Curacao, United Kingdom

[21] Appl. No.: 417,273

[22] Filed: Apr. 5, 1995

Related U.S. Application Data

[63] Continuation of Ser. No. 129,125, filed as PCT/GB92/00544, Mar. 25, 1992 published as WO92/18347, Oct. 29, 1992, abandoned.

[30] Foreign Application Priority Data

Apr. 9, 1991 [GB] United Kingdom ............ 9107435

[51] Int. Cl.$^6$ ............................................. B60N 2/24
[52] U.S. Cl. .................... 296/64; 296/185; 296/146.9
[58] Field of Search ........................ 296/1.1, 63, 64, 296/146.1, 146.9, 185, 193, 197, 203; 297/232; 180/291, 298

[56] References Cited

U.S. PATENT DOCUMENTS

| | | | |
|---|---|---|---|
| 2,751,247 | 6/1956 | Barenyi | 296/64 X |
| 2,839,312 | 6/1958 | Barenyi et al. | 296/64 X |
| 3,035,863 | 5/1962 | Hottle | 296/146.9 X |
| 3,352,597 | 11/1967 | Barenyi et al. | 296/64 X |
| 3,632,156 | 1/1972 | Schweser | 296/185 X |
| 3,632,157 | 1/1972 | Lohr | 296/63 X |
| 3,983,952 | 10/1976 | McKee | 296/185 X |
| 4,489,972 | 12/1984 | Monzini | 296/185 X |
| 4,573,546 | 3/1986 | Irimajiri et al. | 296/185 X |

FOREIGN PATENT DOCUMENTS

| | | | |
|---|---|---|---|
| 0423669 | 4/1991 | European Pat. Off. . | |
| 1144964 | 10/1957 | France . | |
| 2094745 | 2/1972 | France . | |
| 304677 | 3/1918 | Germany . | |
| 321242 | 9/1934 | Italy | 296/64 |
| 6685 | of 1913 | United Kingdom . | |
| 728593 | 4/1955 | United Kingdom | 296/64 |
| 927058 | 5/1963 | United Kingdom . | |
| 1126166 | 9/1968 | United Kingdom . | |

*Primary Examiner*—Dean Kramer
*Attorney, Agent, or Firm*—Cushman, Darby & Cushman

[57] ABSTRACT

A cabin structure for a vehicle has a monocoque construction and includes a support floor having a longitudinal extent and a transverse extent. Roof supports are integrally formed with the support floor and extend upwardly therefrom. Two rear passenger seats supports are supported on the support floor. A driver's seat support is supported on the support floor. The driver's seat support is positioned in the cabin structure centrally of the transverse extent of the support floor, and the driver's seat support is positioned forwardly of the rear passenger seat supports in a direction of the longitudinal extent of the support floor. The two rear passenger seat supports are spaced apart in a direction of the transverse extent of the support floor. The driver's seat support defines a driver seating position and includes two spaced elongate parts extending generally in the direction of the longitudinal extent of the support floor and on each side of the driver seating position.

19 Claims, 4 Drawing Sheets

VEHICLE BODY

This is a continuation of application No. 08/129,125, filed as PCT/GB92/00544, Mar. 25, 1992 published as WO92/18347, Oct. 29, 1992, which was abandoned upon the filing hereof.

The present invention relates to a seating arrangement for a vehicle, and to a cabin structure for a vehicle, and to a vehicle.

Vehicles are often formed to have their engine, transmission, or other weighty parts arranged substantially intermediate their length for stability. This means that the driver's position is more forward than in a front-engined vehicle, for example, and this can result in the driver's controls being offset because of the intrusion of the front wheel arch into the passenger cabin. A forward driver position can also make it difficult to provide an aerodynamic body shape and yet provide sufficient head room for the occupants of the front seats. The front pillars can also restrict the driver's visibility.

The present invention seeks to provide a seating arrangement for a vehicle, or a vehicle structure, which provides better ergonomics for the driver.

According to a first aspect of the present invention there is provided a seating arrangement for a vehicle, the seating arrangement having at least three seats and comprising two spaced rear passenger seats aligned substantially transversely, and a driver's seat arranged substantially centrally and in front of two rear passenger seats, wherein the front driver's seat extends transversely to overlap part of each said rear passenger seat.

It would be possible for a common rear bench seat to be provided in which two rear passenger seats are formed. Alternatively, two separate spaced rear passenger seats may be provided.

In either case, the two rear passenger seats are spaced such that advantage can be taken of the fact that the human passenger generally has a wider trunk or body than legs, and specifically has shoulders of greater width than the width of the legs. This enables passengers to be comfortably seated on the respective rear seats with which the front driver's seat overlaps. This overlapping arrangement enables the cabin of a vehicle to be kept relatively narrow and yet provide accommodation for the driver and for at least two passengers to sit side by side. The arrangement also enables relatively easy access to the passenger seats.

The driver's seat is centrally positioned to give enhanced vision and in line controls for the driver.

In a preferred embodiment, the centrally positioned driver's seat extends rearwardly beyond the front of each rear passenger seat.

Again this overlapping of the driver's seat with the passenger seats enables a compact, but comfortable and accessible, passenger cabin to be provided.

The invention also extends to a seating arrangement for a vehicle, the seating arrangement having at least three seats and comprising two spaced rear passenger seats aligned substantially transversely, and a driver's seat arranged substantially centrally and in front of the two rear passenger seats, wherein the front driver's seat extends rearwardly beyond the front of each the rear passenger seat.

In an embodiment, the driver's seat extends rearwardly beyond the front of each rear passenger seat by a distance which is an approximation to the thigh length of an average human. In a preferred embodiment, the driver's seat projects forwardly of the two rear passenger seats by a distance of the order of 320 mm. By this means, the trunk of each passenger is kept to the rear of the driver for comfort and to avoid interference by the passengers with the driver's visibility, whilst the passengers can extend their legs to the sides of the driver.

Preferably, the centrally positioned, front driver's seat extends transversely to overlap part of each the rear passenger seat. This keeps the overall width of the cabin restricted. The amount of the overlap will depend upon the relative sizes of the seats, their shapes and the like. In a preferred embodiment, the distance between the centre line of the driver's seat and the centre line of each rear passenger seat is of the order of 410 mm.

The present invention also extends to a vehicle incorporating a seating arrangement as defined above.

In a preferred embodiment, vehicle has an engine which is disposed substantially intermediate of the length of the vehicle.

Preferably, the vehicle has a fuel tank which is disposed substantially intermediately of the length of the vehicle. In a preferred embodiment the fuel tank is located rearwardly of the driver's seat.

In a preferred embodiment, the vehicle is provided with front wheel arches which form foot rests for each of the rear passenger seats.

According to a further aspect of the present invention there is provided a cabin structure for a vehicle, cabin structure having a monocoque construction defining a support floor and roof supports, and being arranged to support a centrally positioned driver's seat and two spaced rear passenger seats.

In a preferred embodiment, the monocoque cabin structure itself defines the two spaced rear passenger seats.

Preferably, two spaced rear passenger seats are aligned substantially transversely. Preferably, two spaced front wheel arches are defined by the cabin structure, and each wheel arch is aligned longitudinally with a respective rear passenger seat.

A driver's is arranged to be supported on said cabin structure such that it extends rearwardly of the front of each defined rear passenger seat.

Preferably, the cabin structure is arranged to support a fuel tank behind the position for the driver's seat.

In an embodiment, part of the monocoque construction forming the cabin structure is arranged to extend on each side of the driver position.

Preferably, part of the floor defined by the monocoque construction is removable upon opening of a door.

The present invention also extends to a vehicle incorporating a cabin structure as defined above.

In a preferred embodiment, vehicle has an engine which is disposed substantially intermediate of the length of the vehicle.

Preferably, the vehicle has a fuel tank which is disposed substantially intermediately of the length of the vehicle. In a preferred embodiment the fuel tank is located rearwardly of the driver's seat.

In a preferred embodiment, the vehicle is provided with front wheel arches which form foot rests for each of the rear passenger seats.

Figure 3:
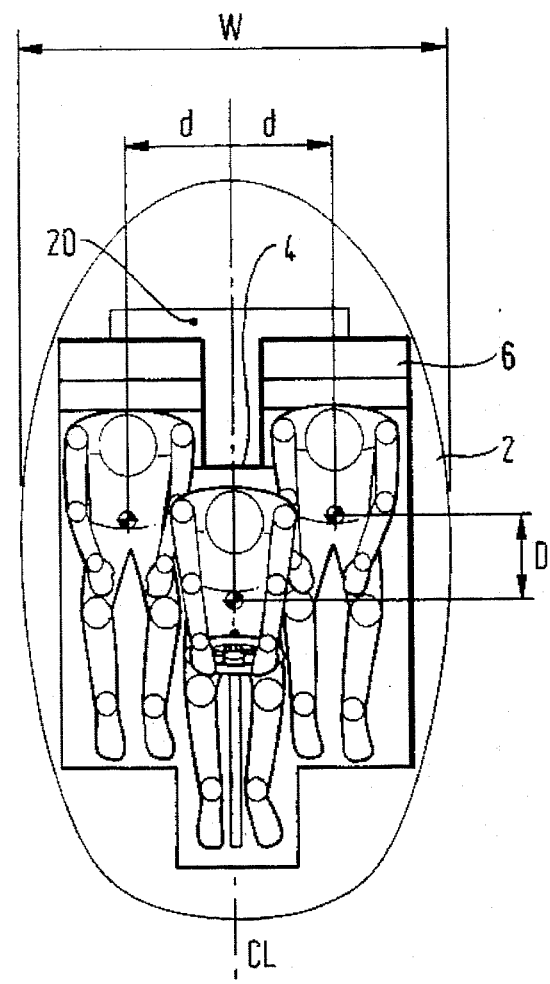
Figure 2:
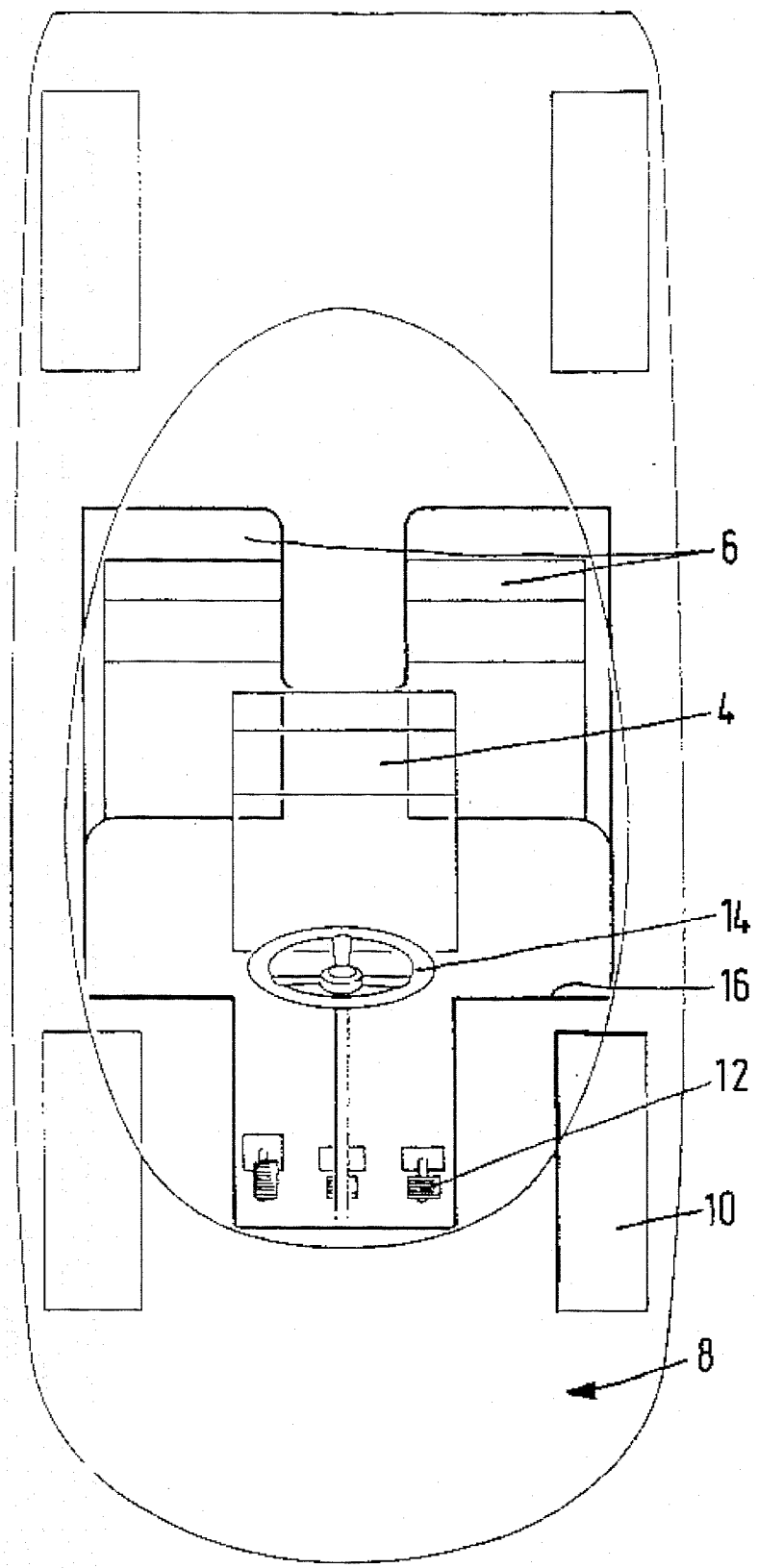
Figure 4:
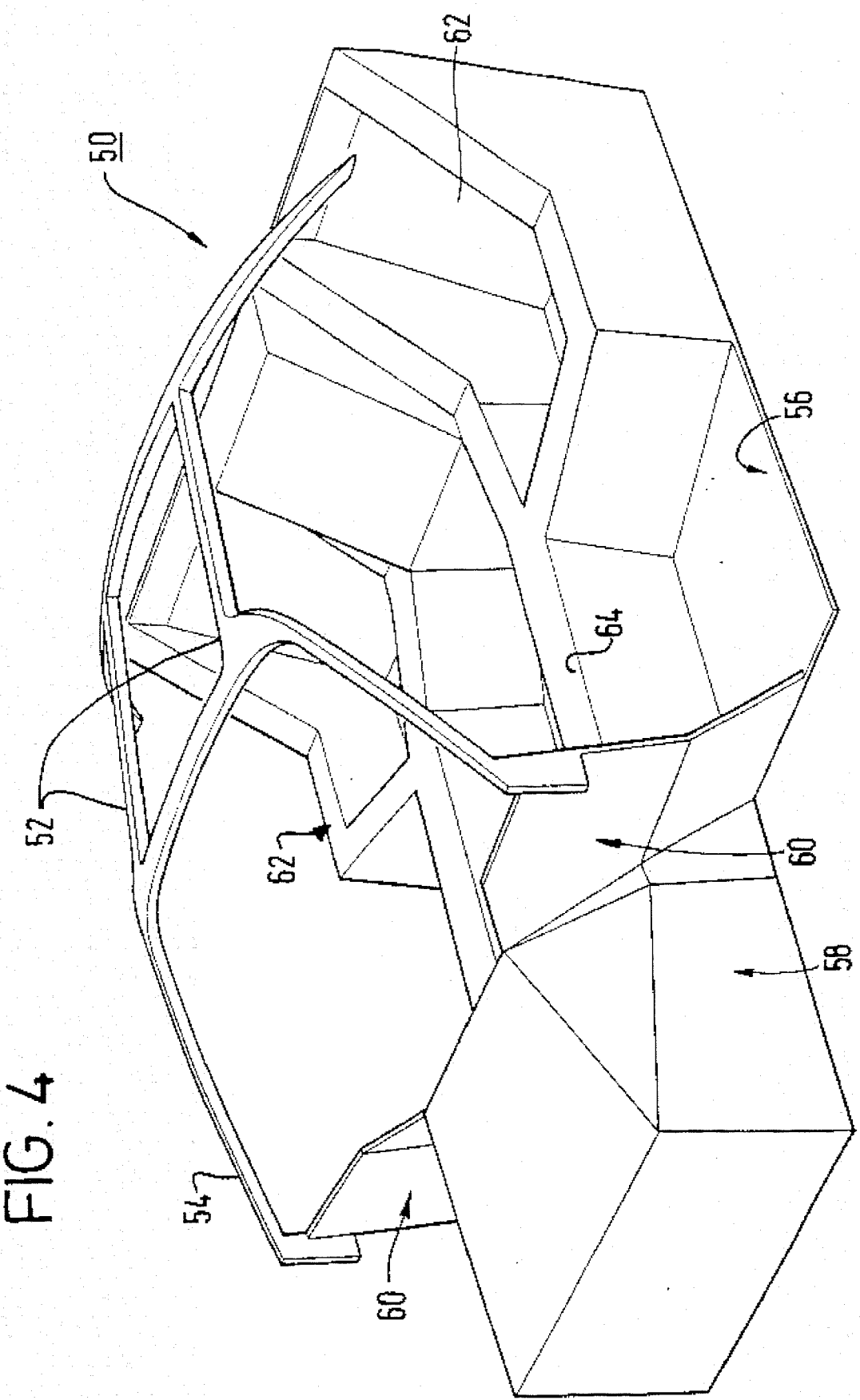
Figure 5:
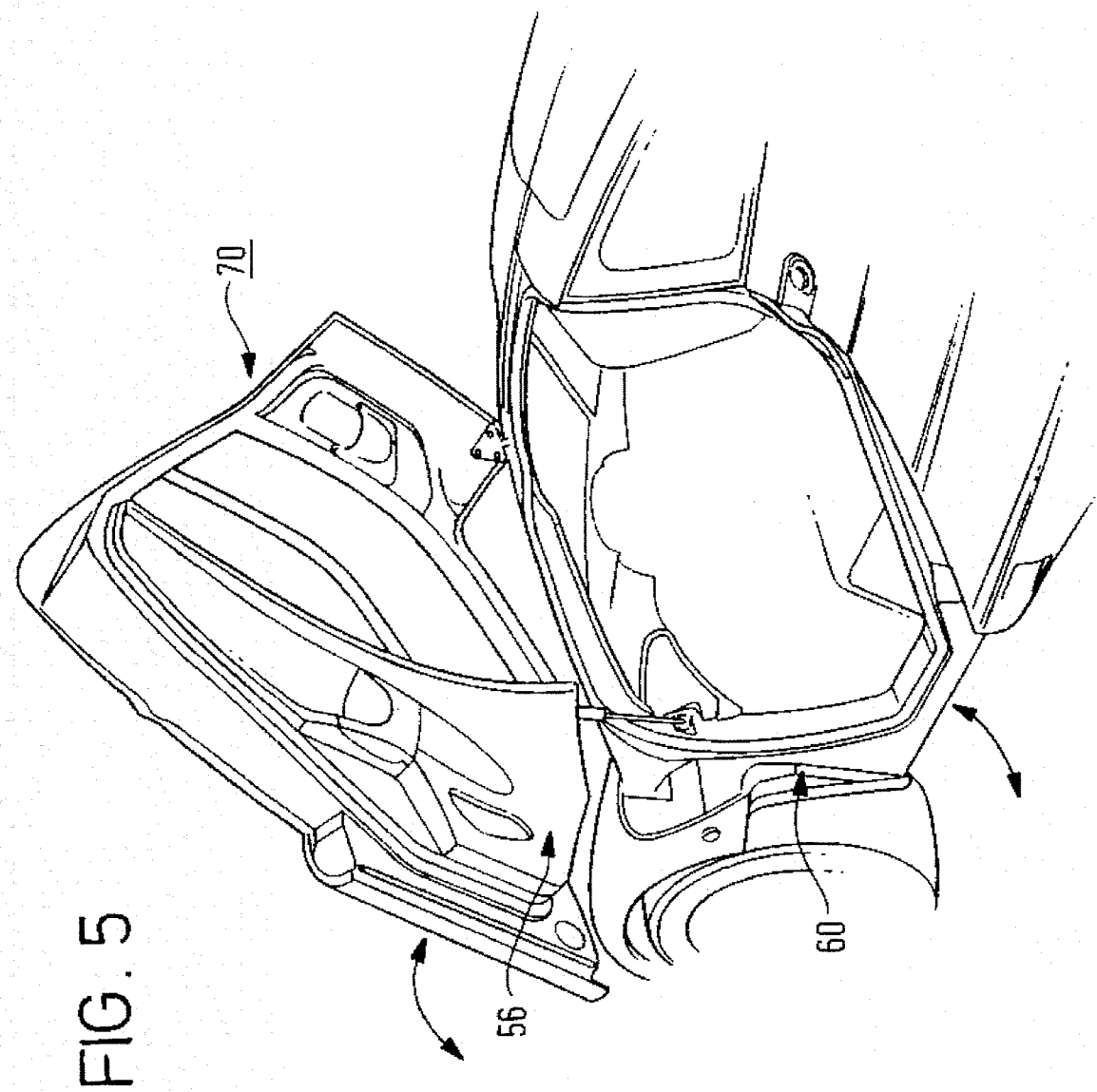

Embodiments of the present invention will hereinafter be defined, by way of example, with reference to the accompanying drawings, in which:

FIG. 1 shows schematically a plan view from above of an embodiment of a seating arrangement of the present invention, FIG. 2 shows a plan view from above of a sports car incorporating the seating arrangement of FIG. 1, FIG. 3 shows a further plan view of the seating arrangement showing dimensions of the arrangement and the provision of a fuel cell or tank, FIG. 4 shows a perspective view of a cabin structure of the present invention providing the seating arrangement illustrated, and FIG. 5 shows schematically an open door of the sports car of FIG. 2, showing a part of a floor structure carried by the door.

FIG. 1 shows schematically a plan view from above of a cabin 2 of a vehicle, such as a sports car, showing the seating arrangement therein. It will be seen, that there is a single, centrally arranged driver's seat 4 and two spaced rear passenger seats 6 which are aligned substantially transversely. Although the driver's seat 4 is arranged generally in front of the two rear passenger seats 6 it does extend rearwardly beyond the front of each rear passenger seat 6. In addition, the driver's seat 4 extends transversely to overlap part of each said rear passenger seat 6.

The three seat arrangement shown in FIG. 1 is comfortable and provides easy access to the seats 4, 6 for all of their occupants. It will be immediately apparent that the seating arrangement is such as to keep the overall width and length taken up by the seats as small as is possible. This compact arrangement is achieved, whilst also providing the necessary space and comfort to the occupants, by utilising the fact that the shoulders and hips of a human, or the trunk generally, is wider than the legs. It is therefore possible to seat a person comfortably behind the driver and provide room for the rear passengers to extend their legs to either side of the driver.

FIG. 2 shows a plan view of a three-seat sports car incorporating the seating arrangement of FIG. 1. As disposed previously, two spaced rear seats 6 are provided rearwardly with respect to the driver's seat 4. In FIG. 2 the body 8 of the car is indicated, together with its wheels 10, and it will be immediately seen that the central position of the driver's seat 4 enables this seat 4 to be aligned with control pedals 12 and a steering wheel 14. Thus, as indicated in FIG. 2, even where the car is made to be mid-engined having its engine intermediate the length of the car, and the driver disposed relatively forwardly, the driver's seat is aligned with the controls and is not offset as is conventional. It will also be appreciated that in the forward central position the ergonomics of the seat for the driver are enhanced as compared with known cars, and the vision for the driver is greatly enhanced. In this respect, it is possible to ensure that no forward pillars intrude into the driver's field of vision.

It will be apparent from FIG. 2 that the driver is to be seated with his legs extending between the two front wheels 10. As is described with reference to FIG. 4, this enables part of the primary structure to be extended on either side of the driver's legs, greatly increasing the crash strength of the vehicle. The central position for the driver means that there is no need to restrict or otherwise compromise on the positioning and size of the front wheel arches, and this means that the wheel lock available and the consequent turning circle can be chosen as required. The two passenger seats 6 are generally each substantially longitudinally aligned with a respective front wheel arch, indicated at 16, and these arches 16 can be formed to provide foot rests for the rear passengers.

Thus, it will be appreciated from a consideration of FIG. 2, that the central driver's position obviates problems normally associated with two and four seat mid-engined sports cars, for example, caused by the front wheel arches intruding into the passenger cabin. The central driving position also makes it unnecessary to provide left and right hand drive versions. In addition, the particular seating arrangement as shown in FIG. 1 enables these advantages to be gained from a central driving position without having to substantially increase the width of the passenger cabin 2.

FIG. 3 shows a further plan view of an embodiment of a seating arrangement of the invention shown within a passenger cabin 2 having a maximum width W of 1,432 mm. This compares favourably with the width of currently available two-seat sports cars. For example, a Ferrari Testarossa is 1,494 mm wide, whilst the Lamborgini Countach is 1,710 mm. In this respect, in the arrangement of FIG. 3, the central driver's seat 4 is offset forwardly of substantial transverse alignment with the two rear passenger seats 6 by a distance D of 320 mm. The distance d between the centre CL of the central driver's seat 4 and the centre of each rear passenger seat 6 is 410 mm.

The positioning of the driver's seat forwardly of the two rear passenger seats 6 enables a safety fuel tank 20 to be located in the vehicle behind the driver's seat 4. This is in the safest possible position for a fuel tank in the event of a crash. Also, for a mid-engined vehicle this central position of the fuel tank coincides with the centre of gravity of the vehicle. The vehicle will therefore have no change in its centre of gravity no matter how full or empty the tank. This gives the car extremely safe dynamic balance characteristics.

FIG. 4 shows schematically a perspective view of a cabin structure for a mid-engined sports car embodying the present invention. This cabin structure 50 is of a monocoque construction of any suitable material, for example, of steel. It will be seen that the cabin structure 50 defines roof supports 52 and a front window frame 54. The cabin structure 50 also defines a floor 56 and a front boot space 58. Front wheel arches 60 are defined on either side of the boot space 58. The cabin structure 50 is fabricated as one piece to include two spaced rear passenger seat supports 62. It will be appreciated that it is only necessary to support appropriate upholstery on the two supports 62 to form the two rear seats 6. Thus, the seat supports 62 are formed as an integral part of the cabin structure 50 and no mounting points therefor are required. Because the passenger seat supports 62 are an integral part of the monocoque structure it will be appreciated that far more of the cross-section of the passenger cabin 2 is part of the primary structure which greatly improves the stiffness of the vehicle chassis and occupant safety.

Having the passenger seat supports 62 moulded into the primary cabin structure 50 enables parts 64 of that structure to be provided to extend on each side of the driver's legs as noted above. The two parts 64 extend from the seat supports 62 and define a well in the cabin structure 50 in which the driver's seat 4 is mounted. Of course, it is generally preferred to mount the driver's seat 4 on the cabin structure 50 for movement with respect thereto so that an appropriate driving position can be chosen.

In a preferred embodiment, one of the parts 64 and an adjacent part of the floor 56 is mounted to be removable when a door 70 mounted on the cabin structure is opened. This enables the driver in the central sitting position to swing his feet to the ground as the door opens. This may be achieved by forming the part 64 and part of the floor 56 integral with the door.

It will be appreciated that although the driver's seat is forwardly of the two passenger seats, the tops of the three seats, supporting the heads of the occupants, are in a similar part of the passenger cabin 2 so that it is a simple matter to provide sufficient headroom at that position.

The embodiment has been described above with particular reference to a three-seater, mid-engined sports car. However, the seating arrangement with its central driving position is advantageous in any type of vehicle, whether or not it is mid-engined. Similarly, the monocoque construction of the cabin structure may be used alone, or with the seating arrangement described and illustrated. The monocoque construction may also be used in any kind of vehicle.

If the length of the vehicle is not a problem, additional rear seats may be provided behind the rear passenger seats shown. Furthermore, it would be possible to provide the two rear seats in a suitably shaped bench seat, for example, connected by upholstery.

It will be appreciated that modifications in and variations to the invention as described above may be made within the scope of the present invention.

I claim:

1. A vehicle having an engine which is disposed substantially in a middle of the length of the vehicle, the vehicle including a seating arrangement having a substantially central longitudinal axis, which extends from a front to a rear thereof, for alignment with a central longitudinal axis of the vehicle, the seating arrangement comprising:

a central driver's seat and first and second individual rear passenger seats, wherein the centre of said driver's seat is arranged on said substantially central longitudinal axis of the seating arrangement, and said first and second rear passenger seats are rearwardly of said driver's seat and are spaced on opposite sides of said substantially central longitudinal axis of the vehicle, centres of said first and second rear passenger seats being aligned along an axis extending substantially transversely to said substantially central longitudinal axis of the seating arrangement, wherein each of said driver's seat and said first and second rear passenger seats has a respective longitudinal centre line which extends through the centre of the respective seat, the longitudinal centre lines of all of the seats extending substantially parallel to each other, generally from the front to the rear of the seating arrangement and substantially parallel to the substantially central longitudinal axis of the seating arrangement, and wherein said driver's seat extends transversely with respect to said central longitudinal axis of the seating arrangement to overlap part of each said rear passenger seat, and said driver's seat extends rearwardly beyond a front of each said rear passenger seat.

2. A vehicle according to claim 1, wherein said driver's seat and said first and second rear passenger seats are substantially at the same horizontal level.

3. A vehicle according to claim 1, wherein the distance between the longitudinal centre line of the driver's seat and the longitudinal centre line of each said rear passenger seat is approximately 410 mm.

4. A vehicle according to claim 1, wherein the driver's seat projects forwardly of the two rear passenger seats by a distance of approximately 320 mm.

5. A cabin structure for a mid-engine vehicle, said cabin structure having a monocoque construction and comprising a support floor having a longitudinal extent and a transverse extent, and roof supports integrally formed with said support floor and extending upwardly therefrom, and said support floor supporting a seating arrangement having a substantially central longitudinal axis which extends along the longitudinal extent of the support floor, the seating arrangement comprising:

a central driver's seat and first and second individual rear passenger seats, wherein a centre of said driver's seat is arranged on said substantially central longitudinal axis of said seating arrangement, and said first and second rear passenger seats are rearwardly of said driver's seat and are spaced on opposite sides of said substantially central longitudinal axis, centres of said first and second rear passenger seats being aligned along an axis extending substantially transversely to said substantially central longitudinal axis along the transverse extent of the support floor, and wherein said driver's seat extends transversely with respect to said central longitudinal axis to overlap part of each said rear passenger seat, and said driver's seat extends rearwardly beyond a front of each said rear passenger seat.

6. A cabin structure according to claim 5, wherein each of said driver's seat and said first and second rear passenger seats has a respective longitudinal centre line which extends through the centre of the respective seat, the longitudinal centre lines of all of seats extending substantially parallel to each other in the direction of the longitudinal extent of the support floor.

7. A cabin structure according to claim 5, wherein a distance between the longitudinal centre line of the driver's seat and the longitudinal centre line of each said rear passenger seat is approximately 410 mm.

8. A cabin structure according to claim 5, wherein the driver's seat projects forwardly of the two rear passenger seats by a distance of approximately 320 mm.

9. A cabin structure according to claim 5 or claim 6, wherein said driver's seat and said first and second rear passenger seats are substantially at the same horizontal level.

10. A cabin structure according to claim 5, further comprising at least one door opening defined therein, and a door mounted on said cabin structure to open and close the door opening, wherein the support floor has a removable part adjacent the door opening between the door opening and the central driver's seat and forward of a rear passenger seat, said removable part being connected to said door, whereupon on opening of said door, said removable part moves with the door such that a person in said central driver's seat may exit easily from the cabin structure.

11. A cabin structure for a mid-engine vehicle having a monocoque construction comprising:

a support floor having a longitudinal extent and a transverse extent, roof supports integrally formed with said support floor and extending upwardly therefrom, two rear passenger seat supports supported on said support floor, and a driver's seat support supported on said support floor, said driver's seat support being positioned in said cabin structure centrally of the transverse extent of said support floor, and said driver's seat support being positioned forwardly of said rear passenger seat supports in the direction of the longitudinal extent of said support floor, said two rear passenger seat supports being spaced apart in a direction of the transverse extent of said support floor, wherein a driver's seat is supported on said driver's seat support, and a respective individual rear passenger seat is supported on each said rear passenger seat support, and wherein said driver's seat extends transversely with respect to the longitudinal extent of the support floor to overlap part of each said rear passenger seat, and said driver's seat extends rearwardly beyond a front of each said rear passenger seat.

12. A cabin structure according to claim 11, wherein said driver's seat support comprises two spaced elongate parts, each elongated part extending from a respective one of said rear passenger seat supports generally in the direction of the longitudinal extent of said support floor, one of said elongated parts being disposed on each side of said driver's seat.

13. A cabin structure according to claim 11, wherein said two rear passenger seat supports and said driver's seat support are integrally formed with said support floor and are thus defined by said monocoque cabin structure.

14. A cabin structure according to claim 11, wherein said two spaced rear passenger seat supports are aligned substantially transversely, and further comprising two spaced front wheel arches integrally formed with said support floor and thus defined by the cabin structure, and wherein each said wheel arch is aligned longitudinally with a respective rear passenger seat support.

15. A cabin structure according to claim 11, further comprising a fuel tank supported by said cabin structure behind said driver's seat support.

16. A cabin structure according to claim 11, wherein said cabin structure includes at least one door opening defined therein; and at least one door mounted on said cabin structure to open and close a respective door opening, wherein the support floor has a plurality of removable parts, each said removable part being adjacent a respective door opening between the door opening and the central driver's seat and forward of a rear passenger seat, each said removable part being connected to the at least one door and mounted at the corresponding door opening, whereby upon opening said at least one door a corresponding removable part of said support floor is removable from its position adjacent the respective door opening such that a person in said central driver's seat may exit easily from the cabin structure.

17. A vehicle comprising:

a cabin structure having a monocoque construction, said cabin structure comprising a support floor having a longitudinal extent and a transverse extent, and roof supports integrally formed with said support floor and extending upwardly therefrom, two rear passenger seat supports supported on said support floor, and a driver's seat support supported on said support floor, said driver's seat support being positioned in said cabin structure centrally of the transverse extent of said support floor, and said driver's seat support being positioned forwardly of said rear passenger seat supports in a direction of the longitudinal extent of said support floor, said two rear passenger seat supports being spaced apart in the direction of the transverse extent of said support floor, and said driver's seat support defining a driver seating position and comprising two spaced elongate parts extending generally in the direction of the longitudinal extent of said support floor and on each side of said driver position, an engine disposed substantially intermediate of the longitudinal extent of said support floor, and a fuel tank disposed substantially intermediate of the longitudinal extent of said support floor and located rearwardly of said driver seating position, wherein a driver's seat is supported on said driver's seat support, and a respective individual rear passenger seat is supported on each said rear passenger seat support, and wherein said driver's seat extends transversely with respect to the longitudinal extent of said support floor to overlap part of each said rear passenger seat, and said driver's seat extends rearwardly beyond a front of each said rear passenger seat.

18. A vehicle according to claim 17, wherein said cabin structure further includes front wheel arches forming foot rests associated with each of the rear passenger seat supports.

19. A vehicle according to claim 17, wherein the driver's seat has a centre line extending in the direction of the longitudinal extent of the cabin structure, and each said rear passenger seat has a centre line extending in the direction of the longitudinal extent of the cabin structure, and wherein the distance between the centre line of the driver's seat and the centre line of each said rear passenger seat is approximately 410 mm.

* * * * *